A. T. BOSSERT.
CONTROLLING MEANS FOR DUMPING WAGONS.
APPLICATION FILED NOV. 4, 1910.
1,033,226.
Patented July 23, 1912.
2 SHEETS—SHEET 1.
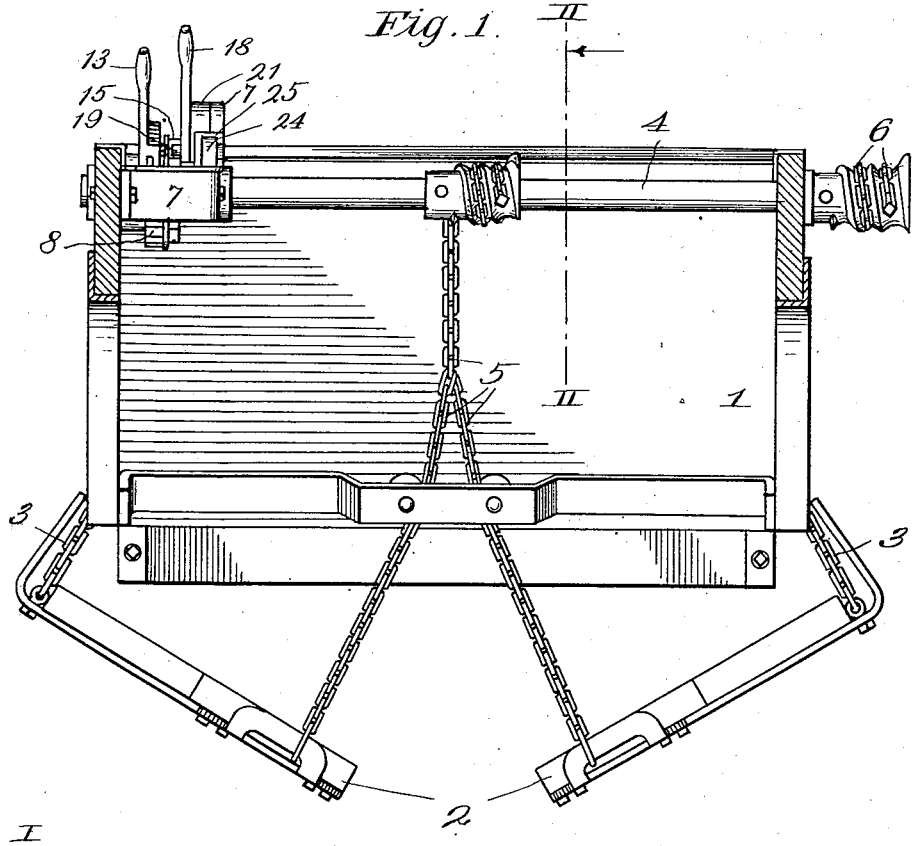
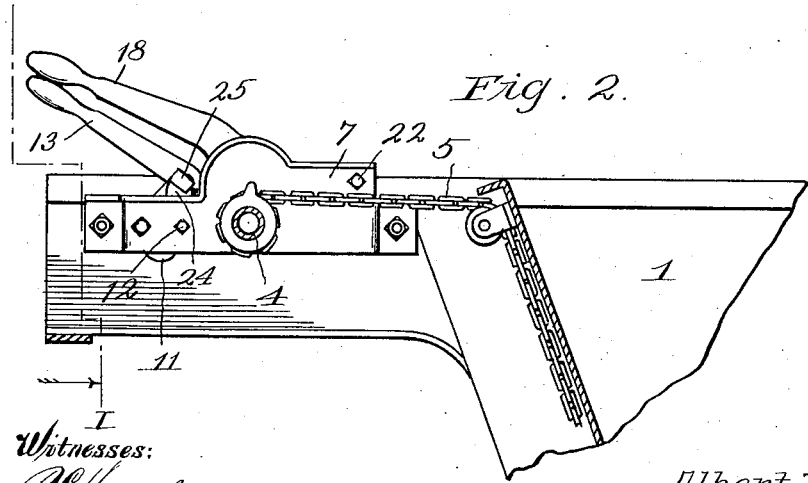
Witnesses:
R. E. Hamilton
E. C. Lillian
Inventor,
Albert T. Bossert,
By F. G. Fischer,
atty.

A. T. BOSSERT.
CONTROLLING MEANS FOR DUMPING WAGONS.
APPLICATION FILED NOV. 4, 1910.

1,033,226.

Patented July 23, 1912.

2 SHEETS—SHEET 2.

Witnesses:
R. E. Hamilton
E. C. Lillian

Inventor,
Albert T. Bossert,
By F. G. Fischer,
Atty.

UNITED STATES PATENT OFFICE.

ALBERT T. BOSSERT, OF KANSAS CITY, MISSOURI, ASSIGNOR TO SMITH & SONS MANUFACTURING COMPANY, OF KANSAS CITY, MISSOURI.

CONTROLLING MEANS FOR DUMPING-WAGONS.

1,033,226.  Specification of Letters Patent.  Patented July 23, 1912.

Application filed November 4, 1910. Serial No. 590,686.

*To all whom it may concern:*

Be it known that I, ALBERT T. BOSSERT, a citizen of the United States, residing at Kansas City, in the county of Jackson and State of Missouri, have invented certain new and useful Improvements in Controlling Means for Dumping-Wagons, of which the following is a specification.

My invention relates to improvements in controlling means for dump-wagons, and is especially adapted for opening and closing the doors of bottom-dumping-wagons.

By employing my invention a load may be dumped in a pile by instantly opening the doors, or the load may be spread over more or less ground, by only partly opening said doors.

Figure 3:
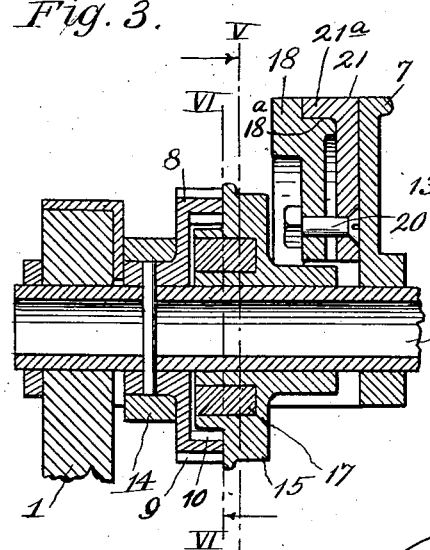
Figure 4:
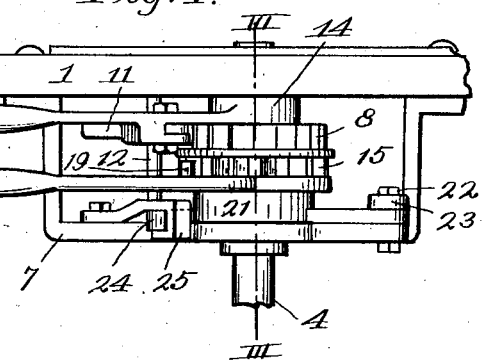
Figure 5:
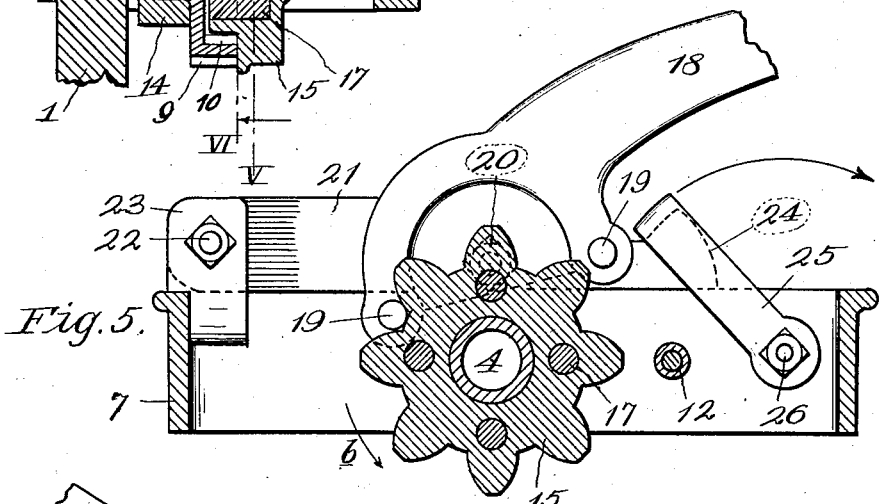
Figure 6:
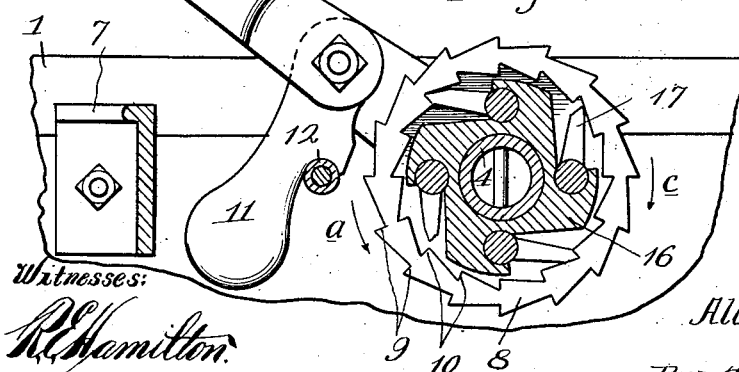

In order that the invention may be fully understood reference will now be made to the accompanying drawings, in which:

Figure 1 is a broken sectional view of a dumping-wagon, taken on line I—I of Fig. 2. Fig. 2 is a vertical section on line II—II of Fig. 1. Fig. 3 is a broken transverse section of the invention on line III—III of Fig. 4. Fig. 4 is a broken plan view of the invention. Fig. 5 is a vertical, longitudinal section of the invention on line V—V of Fig. 3. Fig. 6 is a broken vertical section on line VI—VI of Fig. 3.

1 designates the body of the wagon.

2 designates the bottom dumping-doors loosely secured at their outer sides by chains 3 to body 1 and connected at their inner adjacent sides to a drum or shaft 4 by chains 5 and 6, all of the foregoing being of usual construction.

7 designates a frame secured to one side of body 1, and forming one of the journals for shaft 4.

8 designates a ratchet-wheel arranged within frame 7 and fixed to shaft 4, said ratchet-wheel being provided with external teeth 9 and internal teeth 10.

11 designates a gravity-pawl adapted to engage the external teeth of ratchet-wheel 8 to rotate the same in the direction of arrow $a$, Fig. 6, said pawl being normally held out of engagement with the ratchet-wheel by a transverse rod 12, supported at its ends by frame 7 and the adjacent side of the wagon-body. Pawl 11, is pivotally-mounted upon a hand-lever 13, provided with an integral sleeve 14, swiveled upon the hub of ratchet-wheel 8.

15 designates an escape-wheel loosely-mounted on shaft 4 beside ratchet-wheel 8, and provided with a hub 16 carrying a plurality of pivotally-mounted pawls 17 for engagement with the internal teeth of ratchet-wheel 8, see Fig. 6.

18 designates a hand-controlled escape-lever provided near its fulcrumed end with a pair of laterally-projecting lugs 19, adapted to alternately engage the teeth of escape-wheel 15. Escape-lever 18 is fulcrumed upon a bolt 20 carried by a latch 21, pivotally-mounted at one end upon a bolt 22, carried by a lug 23, secured to frame 7. The free end 24, of latch 21, overlaps the adjacent side of frame 7, down upon which it is normally secured by a hook 25 pivotally-mounted at its lower end upon a bolt 26, extending through the adjacent side of frame 7. Escape-lever 18 is provided with a shoe $18^a$ adapted to frictionally engage a shoe $21^a$, on latch 21.

When it is desired to spread the load over more or less territory, escape-lever 18 is rocked to and fro to allow escape-wheel 15 to turn step by step in the direction of arrows $b$ and $c$, Figs. 5 and 6, respectively, until doors 2 open the desired distance. The turning of escape-wheel 15 is accomplished by the weight of doors 2 and the load thereon which pull downwardly upon chains 5 and 6, causing them to rotate drum 4 and ratchet-wheel 8, which latter turns the escape-wheel 15 through the intermediacy of teeth 10, pushing against the engaging pawls 17. The jar incident to the teeth of the escape-wheel 15 striking lugs 19, is largely absorbed by frictional engagement between shoes $18^a$ and $21^a$, hence but little shock is transmitted to the handle of lever 18. When it is desired to instantly open the doors to dump the dirt in a pile, hook 25, is disengaged from latch 21, and lever 18 is pushed downward to disengage the rear lug 19, from escape-wheel 15, which rotates rapidly in the direction of arrow $b$. As the escape-wheel 15 rotates it strikes the front lug 19 and throws latch 21 and lever 18 upward, the latter carrying the front lug 19 out of the path of the escape-wheel. After the load has been discharged the doors are closed by swinging lever 13 in the direction of arrow $d$ to disengage pawl 11 from rod 12 and allow said pawl to engage teeth 9 of ratchet-wheel 8, which is turned in the direction of arrow $a$ step by step by intermittently swinging lever 13 in a direction opposite to arrow *d*. When lever 13 is swung in the direction of arrow *d*, the doors are prevented from opening by ratchet-wheel 8, being secured from rotation in the direction of arrow *c* through the intermediacy of pawls 17 engaging teeth 10. After the doors have been closed pawl 11 is disengaged from ratchet-wheel 8 and lever 13, is swung to the position shown in Fig. 6, until pawl 11 engages rod 12, which holds it out of engagement with the ratchet-wheel 8 so that the doors may be opened as above described.

Having thus described my invention, what I claim, and desire to secure by Letters Patent, is:—

1. In combination with a bottom dump-wagon, an escape wheel geared to the doors of said wagon to permit them to open step by step, an escape-lever operably-engaging said escape-wheel to control the movement of the same, a pivotally-mounted latch upon which said escape lever is fulcrumed so that the same may be thrown out of engagement with the escape-wheel, and a hook for holding said latch in operative position.

2. In combination with a bottom dump-wagon having a drum to which the bottom doors of the wagon are suitably connected, an escape-wheel loosely-mounted upon said drum to control the opening of the doors, a ratchet-wheel fixed to the drum to turn the escape-wheel in one direction to open the doors, and manually-operable means for turning said ratchet-wheel in an opposite direction to close the doors.

3. In combination with a bottom dump-wagon, an escape-wheel geared to the doors of said wagon to permit them to open step by step, an escape-lever operably-engaging said escape-wheel to control the movement of the same, a pivotally-mounted latch upon which said escape-lever is fulcrumed so that the same may be thrown out of engagement with the escape-wheel, and coacting frictional means between the escape-lever and said latch.

4. In combination with a bottom dump-wagon, a journaled drum on said wagon, flexible means connecting said drum and the doors of the wagon whereby the latter may be closed by the former, a ratchet-wheel fixed to the drum and provided with external and internal teeth, means to engage the external teeth to rotate the ratchet-wheel forward to close the doors, pivotally-mounted pawls engaging the internal teeth to prevent accidental backward rotation of the ratchet-wheel, an escape-wheel carrying said pawls, and an escape-lever to hold the escape-wheel from accidental rotation.

5. In combination with a bottom dump-wagon, a journaled drum on said wagon, flexible means connecting said drum and the doors of the wagon whereby the latter may be closed by the former, a ratchet-wheel fixed to the drum and provided with external and internal teeth, means to engage the external teeth to rotate the ratchet-wheel forward to close the doors, pivotally-mounted pawls engaging the internal teeth to prevent accidental backward rotation of the ratchet-wheel, an escape-wheel carrying said pawls, an escape-lever to hold the escape-wheel from accidental rotation, and movable means upon which the escape-lever is mounted so that the same may be thrown out of engagement with the escape-wheel to allow the doors to suddenly open.

In testimony whereof I affix my signature, in the presence of two witnesses.

ALBERT T. BOSSERT.

Witnesses:
F. G. FISCHER,
E. C. LILLIAN.

---

Copies of this patent may be obtained for five cents each, by addressing the "Commissioner of Patents, Washington, D. C."